US011182844B2

(12) United States Patent
Chen

(10) Patent No.: US 11,182,844 B2
(45) Date of Patent: Nov. 23, 2021

(54) VIRTUAL RESOURCE TRANSFER METHOD, CLIENT DEVICE, APPLICATION SERVER, AND SYSTEM

(71) Applicant: TENCENT TECHNOLOGY (SHENZHEN) COMPANY LIMITED, Shenzhen (CN)

(72) Inventor: Huashan Chen, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 495 days.

(21) Appl. No.: 15/821,611

(22) Filed: Nov. 22, 2017

(65) Prior Publication Data
US 2018/0096416 A1    Apr. 5, 2018

Related U.S. Application Data

(63) Continuation of application No. PCT/CN2016/091799, filed on Jul. 26, 2016.

(30) Foreign Application Priority Data

Jul. 31, 2015 (CN) .......................... 201510466637.4

(51) Int. Cl.
*G06Q 30/00* (2012.01)
*G06Q 30/06* (2012.01)
(Continued)

(52) U.S. Cl.
CPC ....... *G06Q 30/0641* (2013.01); *G06F 9/5077* (2013.01); *G06Q 20/227* (2013.01);
(Continued)

(58) Field of Classification Search
CPC ............. G06Q 20/325; G06Q 30/0641; G06Q 20/425; G06Q 20/382; G06Q 20/405;
(Continued)

(56) References Cited

U.S. PATENT DOCUMENTS 10,291,574 B2 * 5/2019 Bijor ...................... H04W 4/023
2007/0192111 A1 * 8/2007 Chasen ............ G06Q 10/08345
705/335
(Continued)

FOREIGN PATENT DOCUMENTS

CN    103793801 A    5/2014
CN    104123637 A    10/2014
(Continued)

OTHER PUBLICATIONS

"City Start-Up Promises to Book, Deliver Parcel on Same Day," The New Indian Express [Chennai] Jan. 2, 2015, Dialog #1641352249, 2pgs.*
(Continued)

*Primary Examiner* — Robert M Pond
(74) *Attorney, Agent, or Firm* — Anova Law Group, PLLC

(57) ABSTRACT

The present disclosure discloses a virtual resource transfer method, including: responding to a first login request from a first client for logging into a public service account; receiving a service request initiated by the first client; responding to a second login request from a second client for logging into the public service account; sending information about the service request of the first client to the second client; receiving service order information for the service request from the second client; generating, by an application server associated with the public service account, a virtual resource transfer request according to the service order information; sending the virtual resource transfer request to the first client by using the public service account, the virtual resource transfer request being configured for transferring, from the first client, a virtual resource in a first virtual resource account to a second virtual resource account.

17 Claims, 11 Drawing Sheets

(51) Int. Cl.
  *G06Q 20/32* (2012.01)
  *G06Q 20/42* (2012.01)
  *G06Q 20/40* (2012.01)
  *G06Q 20/38* (2012.01)
  *G06F 9/50* (2006.01)
  *G06Q 20/22* (2012.01)
  *G06Q 50/28* (2012.01)

(52) U.S. Cl.
  CPC ....... *G06Q 20/325* (2013.01); *G06Q 20/3223* (2013.01); *G06Q 20/382* (2013.01); *G06Q 20/385* (2013.01); *G06Q 20/405* (2013.01); *G06Q 20/4012* (2013.01); *G06Q 20/425* (2013.01); *G06Q 50/28* (2013.01)

(58) Field of Classification Search
  CPC ........... G06Q 20/4012; G06Q 20/3223; G06Q 20/227; G06Q 20/385; G06Q 10/08355; G06Q 10/06311; G06Q 50/28; G06F 9/5077; G06F 16/9537; G06F 16/29
  USPC ..................................................... 705/26, 27
  See application file for complete search history.

(56) References Cited

U.S. PATENT DOCUMENTS

| | | | | |
|---|---|---|---|---|
| 2011/0196782 A1* | 8/2011 | Allen | ..................... | G06Q 20/10 |
| | | | | 705/39 |
| 2014/0058862 A1* | 2/2014 | Celkonas | ............. | G06Q 20/102 |
| | | | | 705/18 |
| 2015/0186869 A1* | 7/2015 | Winters | ............. | G06Q 20/3255 |
| | | | | 705/26.81 |
| 2015/0269521 A1* | 9/2015 | Knapp | ............. | G06Q 10/08355 |
| | | | | 705/338 |
| 2016/0104112 A1* | 4/2016 | Gorlin | ............. | G06Q 10/08355 |
| | | | | 705/338 |
| 2016/0232487 A1* | 8/2016 | Yonker | ............. | G06Q 10/0835 |
| 2017/0034110 A1* | 2/2017 | Bijor | ...................... | H04W 4/42 |

FOREIGN PATENT DOCUMENTS

| | | | |
|---|---|---|---|
| CN | 104636901 A | 5/2015 |
| CN | 104732373 A | 6/2015 |
| CN | 104778582 A | 7/2015 |
| CN | 104780137 A | 7/2015 |
| CN | 105160522 A | 12/2015 |

OTHER PUBLICATIONS

"Delivering more than goods Concierge services pick up food, laundry and gifts all with a smile." Brochu, Nicole . South Florida Sun—Sentinel [Fort Lauderdale, Fla] Oct. 6, 2014: B.I., Dialog #1586122060, 2pgs.*

GuruFocus.com: "On My Way" New Service of Amazon Weblog post, Newstex Finance & Accounting Biogs, Newstex . Jun. 23, 2015, Dialog #1690494866 3pgs.*

The State Intellectual Property Office of the People's Republic of China (SIPO) Office Action 1 for 201510466637.4 dated May 3, 2017 10 Pages (including translation).

The World Intellectual Property Organization (WIPO) International Search Report for PCT/CN2016/091799 dated Oct. 26, 2016 6 Pages (including translation).

* cited by examiner

VIRTUAL RESOURCE TRANSFER METHOD, CLIENT DEVICE, APPLICATION SERVER, AND SYSTEM

CROSS-REFERENCES TO RELATED APPLICATIONS

This disclosure is a continuation application of PCT Patent Application No. PCT/CN2016/091799, filed on Jul. 26, 2016, which claims priority to the earlier application with Application No. 201510466637.4, entitled "VIRTUAL RESOURCE TRANSFER METHOD AND RELATED DEVICE AND SYSTEM" filed on Jul. 31, 2015, the entire contents of both of which are incorporated herein by reference.

FIELD OF THE TECHNOLOGY

The present disclosure relates to the field of the Internet of computers, and in particular, to a virtual resource transfer method, a relevant device, and a system.

BACKGROUND OF THE DISCLOSURE

With development of electronic technologies and the Internet technologies, functions of electronic devices (in particular, smart mobile devices) become more powerful. Users only need to install various applications on the electronic devices according to their requirements, so as to do various things, for example, go shopping by using the Internet and finally, receive commodities sent by businesses.

Currently, many services require users to inform, in conventional non-Internet manners, organizations that provide the services, and the organizations that provide the services send service personnel to locations of the users to deal with the services, and charge the users by means of the service personnel. For example, when needing to send a commodity, a business usually calls a logistics company, the logistics company sends a courier to perform door-to-door pick-up. While performing door-to-door pick-up, the courier calculates an express fee and charges the business the express fee on site (also needs to make change when necessary). In the prior art, a lot of fees charged for many services need to be handed by service personnel to companies or enterprises that provides the services. Consequently, not only operation processes are cumbersome and cannot be completely monitored by the companies or enterprises, easily resulting in security problems, but also requirements for security, reliability, rapidity, and convenience on service fee charging cannot be satisfied currently.

SUMMARY

A technical problem to be addressed by embodiments of the present disclosure is to provide a virtual resource transfer method, a client device, an application server, and a virtual resource transfer system.

A first aspect of the embodiments of the present disclosure provides a virtual resource transfer method, including: responding to a first login request from a first client for logging into a public service account; receiving a service request initiated by the first client after the first client is logged in; responding to a second login request from a second client for logging into the public service account; sending information about the service request of the first client to the second client after the second client is logged in; receiving service order information for the service request from the second client; generating, by an application server associated with the public service account, a virtual resource transfer request according to the service order information; sending the virtual resource transfer request to the first client by using the public service account, the virtual resource transfer request being configured for transferring, from the first client, a virtual resource in a first virtual resource account to a second virtual resource account.

A second aspect of the embodiments of the present disclosure provides a virtual resource transfer method, including: logging into a public service account; obtaining a service request after logging in to the public service account, the service request being a service request initiated, based on the public service account, by a first client by logging in to the preset public service account; and inputting, based on the public service account, service order information for the service request, so that an application server associated with the public service account generates a virtual resource transfer request according to the service order information, and sends the virtual resource transfer request to the first client by using the public service account, and after receiving the virtual resource transfer request, the first client transfers a virtual resource in a first virtual resource account to a second virtual resource account.

A third aspect of the embodiments of the present disclosure provides a client device, including: a memory, which stores computer readable program code; and a processor, configured to execute the computer readable program code to perform the following operations: logging in to a public service account, and initiating, based on the public service account, a service request, so that after obtaining the service request by logging in to the public service account, a second client inputs, based on the public service account, service order information for the service request, and an application server associated with the public service account generates a virtual resource transfer request according to the service order information, and sends the virtual resource transfer request to the client device by using the public service account; and after receiving the virtual resource transfer request, transferring a virtual resource in a first virtual resource account to a second virtual resource account.

A fourth aspect of the embodiments of the present disclosure provides a client device, including: a memory, which stores computer readable program code; and a processor, configured to execute the computer readable program code to perform the following operations: logging into a public service account; obtaining a service request after logging in to the public service account, the service request being a service request initiated, based on the public service account, by a first client by logging in to the public service account; and inputting, based on the public service account, service order information for the service request, so that an application server associated with the public service account generates a virtual resource transfer request according to the service order information, and sends the virtual resource transfer request to the first client by using the public service account, and after receiving the virtual resource transfer request, the first client transfers a virtual resource in a first virtual resource account to a second virtual resource account.

A fifth aspect of the embodiments of the present disclosure discloses an application server, including: a memory, which stores computer readable program code; and a processor, configured to execute the computer readable program code to perform the following operations: responding to a first login request from a first client for logging into a public service account; receiving a service request initiated by the first client; responding to a second login request from a second client for logging into the public service account; sending information about the service request of the first client to the second client; receiving service order information for the service request from the second client; generating, by an application server associated with the public service account, a virtual resource transfer request according to the service order information; sending the virtual resource transfer request to the first client by using the public service account, so that after receiving the virtual resource transfer request, the first client first transfers a virtual resource in a first virtual resource account to a second virtual resource account.

A sixth aspect of the embodiments of the present disclosure provides a virtual resource transfer system, including a first client, a second client, and an application server, the first client logging in to a public service account, and initiating, based on the public service account, a service request; after obtaining the service request by logging in to the public service account, the second client inputting, based on the public service account, service order information for the service request; an application server associated with the public service account generating a virtual resource transfer request according to the service order information, and sending the virtual resource transfer request to the first client by using the public service account; and after receiving the virtual resource transfer request, the first client transferring a virtual resource in a first virtual resource account to a second virtual resource account.

A seventh aspect of the embodiments of the present disclosure provides a computer storage medium, the computer storage medium storing a program, when executed, the program including all steps of the virtual resource transfer method in the first aspect of the embodiments of the present disclosure.

BRIEF DESCRIPTION OF THE DRAWINGS

To describe the technical solutions of the embodiments of the present disclosure or the existing technology more clearly, the following briefly introduces the accompanying drawings required for describing the embodiments or the existing technology. Apparently, the accompanying drawings in the following description show only some embodiments of the present disclosure, and a person of ordinary skill in the art may still derive other drawings from these accompanying drawings without creative efforts.

DESCRIPTION OF EMBODIMENTS

The technical solution of the present disclosure will be clearly and completely described in the following with reference to the accompanying drawings. It is obvious that the embodiments to be described are only a part rather than all of the embodiments of the present disclosure. All other embodiments derived by a person of ordinary skill from the embodiments of the present disclosure without creative efforts shall fall within the protection scope of the present disclosure.

Figure 1:
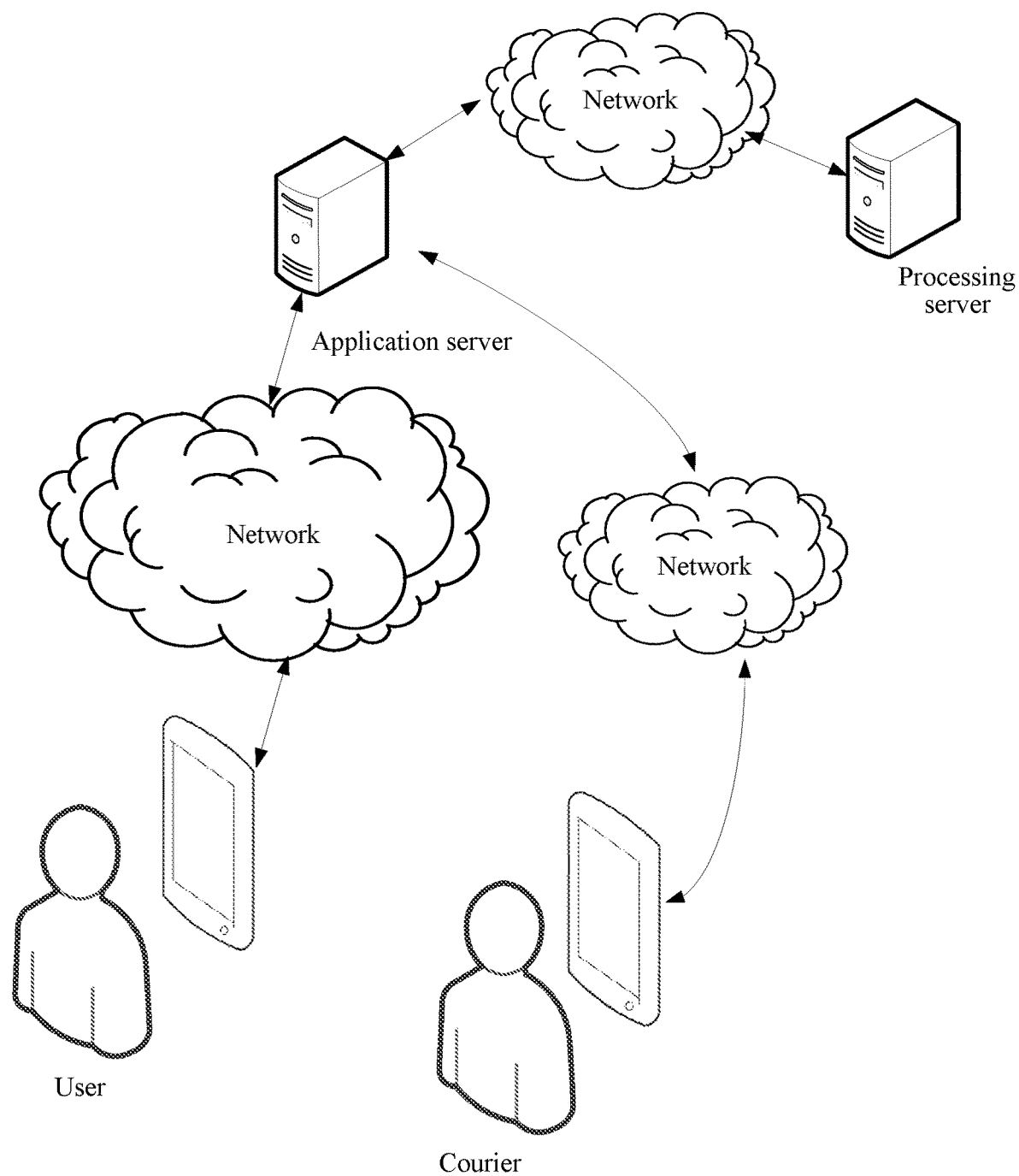
FIG. 1 is a schematic diagram of an application scenario of a virtual resource transfer method according to an embodiment of the present disclosure.

Various embodiments of the present disclosure may be implemented based on an application scenario shown in FIG. 1. A sending service is used as an example. When a user needs to send an express item/package, the user may log in to a public service account by using a client, and then, initiates, based on the public service account, a sending request. A courier may use his or her client to perform login and view the sending request initiated by the user on the public service account, then, pick up the express item of the user door to door, and at the same time, input, based on the public service account, sending order information, such as a destination, a weight of the item, and a fee for the item, for the express item. Hence, an application server receives the sending order information input by the courier, generates a virtual resource transfer request, and sends the virtual resource transfer request to the user by using the public service account to prompt the user to perform virtual resource transfer. The user can perform online virtual resource transfer by using the client to complete payment.

It should be noted that in the embodiments of the present disclosure, a public service account is a service account registered by a developer or a service provider in an Internet application. The developer or the service provider may provide a corresponding service for one or more users in the Internet application by using the public service account. For example, a logistics or express company registers, based on some instant communication Internet applications, for a public service account to provide logistics or express services for users by using the public service account and sets relevant interfaces of the public service account to implement relevant functions of logistics or express. Hence, a user may log in to the public service account and initiate a sending request based on the public service account.

It could be understood that the Internet application corresponds to a backend server (that is, a processing server), configured to process various requirements of the Internet application in a process of implementing a corresponding function, and further configured to manage relevant information of a user in the Internet application, relevant information of a public service account, and interactive manages between users or between a user and a public service account. The relevant information of a user may include, but is not limited to, information such as an account, an identifier, a password, and a relationship chain. The relevant information of a public service account may include, but is not limited to, information such as an account, an identifier, and register information. In the embodiments of the present disclosure, a public service account may correspond to an associated server. The associated server of the public service account is a server that provides a service, such as message pushing, for a user in the Internet application. Specifically, the associated server of the public service account may be an application server. For example, a developer of a logistics or express company registers a public service account whose identifier is xx in a social application, the associated server of the public service account xx may be an application server of a logistic service application, the associated server of the public service account xx may use an interactive interface as a service page to provide a service for a user in the social application.

It can be understood that different users may use different login credentials to access the public service account. The user interface for different types of users provided by the pubic service account may also be different. In one example, when a client user that requesting the service logs in to the public service account (e.g., from the first client), a user interface may solicit the client user to input service requesting information (e.g., a pick-up address for a to-be-delivered package). Further, the application server associated with the public service account may record user profile and previous order history, and the client user requesting the service may view and modify related information on the user interface. In another example, the application server may automatically respond to the client user request by assigning related service task to one or more staff users. When a staff user of the public service logs in to the public service account (e.g., from a second client), a user interface may present tasks assigned to the staff user (e.g., a pick-up address belonging to a service area of a mailman). The user interface of the staff user may further monitor and/or facilitate the work flow of the requested service, such as provide navigation to the pick-up address, provide instructions for picking up a package, communicating with a client and other actions for logistics of the package.

It should be noted that in the embodiments of the present disclosure, the processing server and the application server may be two independent servers or may be integrated in a same server to have both a function of the processing server and a function of the application server. No limitation is imposed in the present disclosure.

A first client or a second client in each embodiment of the present disclosure may be specifically a client of a user after the user logs in to a virtual resource interaction platform, that is, may be an account, such as an email address, a mobile phone number, or another identifier, of a user that logs in to the virtual resource interaction platform. The client may also be user equipment running the virtual resource interaction platform to which the user logs in, that is, that is, the virtual resource interaction platform to which the user logs in runs on the user equipment (that is, the client). The user equipment may include, but is not limited to, user equipment such as a mobile phone, a mobile computer, a tablet computer, a Personal Digital Assistant (PDA), a media player, a smart television, a smart swatch, smart glasses, and a smart bracelet.

It should also be noted that in the embodiments of the present disclosure, a virtual resource may be a virtual resource, for example, a virtual item such as a gold coin, a diamond, or a crystal, for paying a service fee in a public service account based on a service application. The virtual item may be purchased by using money in reality and may be converted from or to money in reality. In the embodiments of the present disclosure, the virtual resource may also be directly a corresponding balance of a bank account in reality and may be directly used to pay the service fee.

The following uses an express service as an example to describe a specific implementation of a virtual resource transfer method of the present disclosure in detail with reference to embodiments of FIG. 2 to FIG. 5. However, the embodiments of the present disclosure include, but are not limited to, the express service, and may further include other services such as door-to-door electrical appliance repair and door-to-door furniture finishing.

Figure 2:
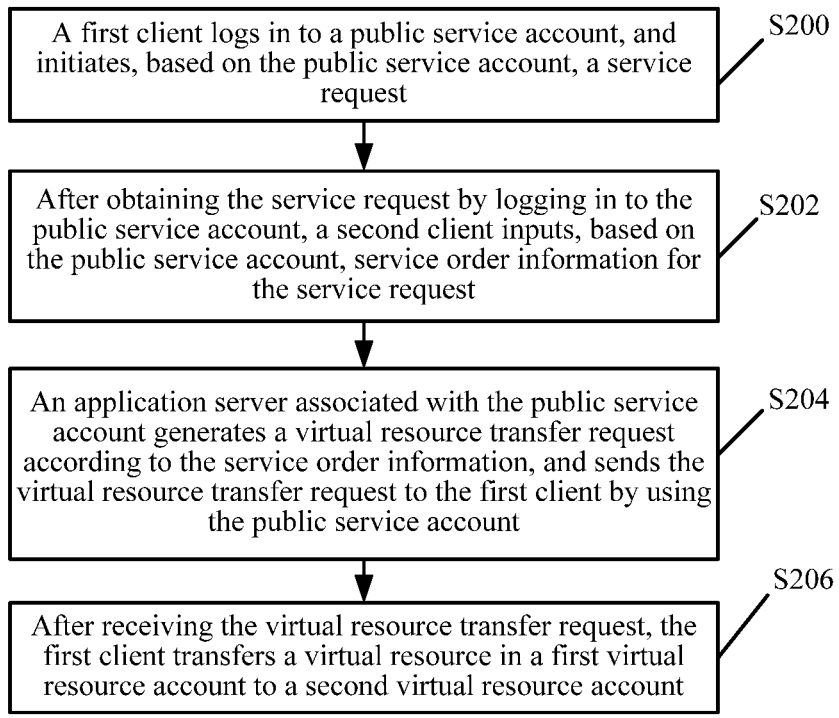
FIG. 2 is a flowchart of a virtual resource transfer method according to an embodiment of the present disclosure.

As shown in FIG. 2, a flowchart of a virtual resource transfer method according to an embodiment of the present disclosure includes:

Step S200: A first client logs in to a public service account, and initiates, based on the public service account, a service request.

Specifically, when a user needs to send an express item, the user may use his or her electronic device to log in to a public service account by using an identity of the first client. In this embodiment, the first client being a user account when logging in to the public service account is used as an example for description. Then, a sending request is initiated on the public service account. It could be understood that the public service account is provided with an interface (such as a virtual button) for initiating a sending request, the user may initiate a sending request to a courier by using the interface, and the sending request may include basic information such as an address of the user. The basic information of the user may be filled in when the user registers the public service account. Alternatively, the basic information (such as an address of the user or an address of a destination) required for the sending may be filled in according to requirements after the sending request is initiated.

Step S202: After obtaining the service request by logging in to the public service account, a second client inputs, based on the public service account, service order information for the service request.

Specifically, a courier uses his or her electronic device to log in to the public service account by using an identity of the second client. Similarly, in this embodiment, the second client being a user account when logging in to the public service account is used as an example for description. If the courier sees, on the public service account, the sending request initiated by the user, the courier may perform door-to-door pick-up according to the user basic information carried in the sending request.

It should be noted that, in the embodiment of the present disclosure, the sending request does not need to carry address information of the destination required by the user, and instead, when picking up the express item door to door, the courier learns the address information of the destination from the user, and then, fills sending order information for the sending request in the public service account, so that the public service account receives the input sending order information. It could be understood that in the embodiment of the present disclosure, the sending order information may include, but is not limited to, weight information of the express item, address information of the destination, and attribute information of the express item.

Step S204: An application server associated with the public service account generates a virtual resource transfer request according to the service order information, and sends the virtual resource transfer request to the first client by using the public service account.

Specifically, after the public service account receives the sending order information, the sending order information is uploaded to an application server associated with the public service account. The application server may calculate a fee according to the sending order information to generate a virtual resource transfer request. Alternatively, the sending order information received by the application server has carried fee information reported by the courier, so that a virtual resource transfer request may be directly generated, and the virtual resource transfer request is sent to the first client of the user by using the public service account.

Step S206: After receiving the virtual resource transfer request, the first client transfers a virtual resource in a first virtual resource account to a second virtual resource account.

Specifically, after receiving the virtual resource transfer request, the first client on the user side performs virtual resource transfer. It could be understood that the public service account is provided with an interface (such as a virtual button) for performing virtual resource transfer, and the interface may invoke a functional module that performs virtual resource transfer to perform virtual resource transfer. The user performs virtual resource transfer to a preset virtual resource receiving part (that is, the second virtual resource account) by using the interface, and transfers a virtual resource from the first virtual resource account of the user to the second virtual resource account to complete online payment.

It could be understood that the application server may determine a transfer processing result according to a settlement manner of a company or an enterprise. The settlement manner may include, but is not limited to, a real-time settlement manner or a non-real-time settlement manner. The real-time settlement manner may include separate settlement, which is settlement performed according to an amount of each transaction. The non-real-time settlement manner may include, but is not limited to, weekly settlement (that is, settlement performed according to a total amount of transactions of each week) and monthly settlement (that is, settlement performed according to a total amount of transactions of each month). If a settlement manner of a company or an enterprise is a real-time settlement manner, if a virtual resource in a first virtual resource account associated with the first client is successfully transferred to a second virtual resource account, transfer processing succeeds. Otherwise, virtual resource transfer processing fails. If a settlement manner of a company or an enterprise is a non-real-time settlement manner, if a virtual resource in a first virtual resource account associated with the first client is successfully removed from the first virtual resource account associated with the first client, transfer processing succeeds. Otherwise, virtual resource transfer processing fails.

It could be understood that in the embodiment of the present disclosure, the invoked functional module for virtual resource transfer may be a functional module provided by a backend server (that is, a processing server) corresponding to an Internet application or may be a processing server corresponding to an application that can provides virtual resource transfer. No limitation is imposed in the present disclosure.

In the embodiments of the present disclosure, a first client initiates a service request by logging in to a public service account, a second client inputs, based on the public service account, service order information for the service request, an application server generates a virtual resource transfer request according to the service order information, and after receiving the virtual resource transfer request, the first client transfers a virtual resource in a first virtual resource account to a second virtual resource account, so that technical problems that operation processes of many services (such as an express service) are cumbersome and security cannot be ensured are resolved, payment for the services (such as an express fee) can be completely monitored by companies or enterprises, requirements for security, reliability, rapidity, and convenience on service fee charging in the prior art can be satisfied, and payment for the services is greatly facilitated for users.

Figure 3:
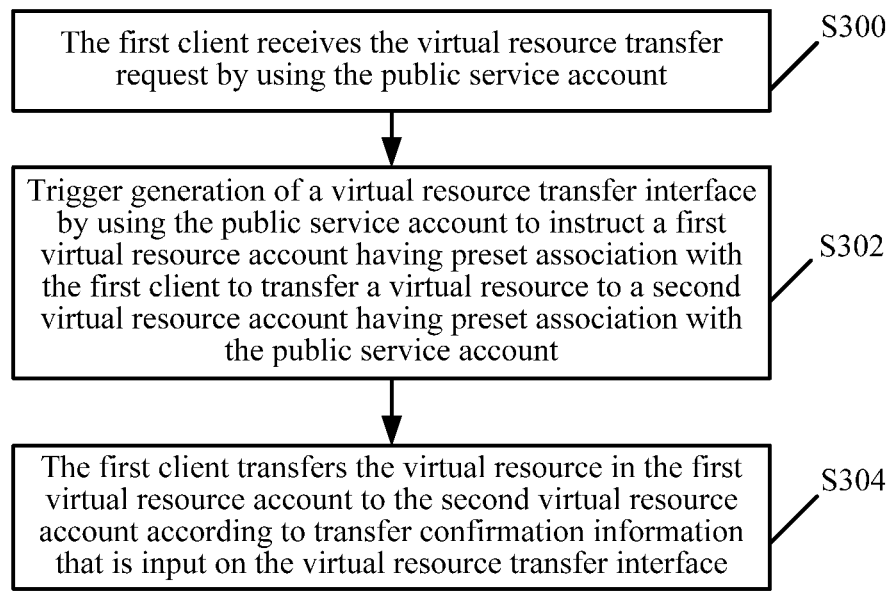
FIG. 3 is a flowchart of another embodiment of a virtual resource transfer method according to the present disclosure.

Further, with reference to FIG. 3, which is a flowchart of another embodiment of a virtual resource transfer method according to the present disclosure, an implementation of step S206, after receiving the virtual resource transfer request, the first client transfers a virtual resource in a first virtual resource account to a second virtual resource account, is described in detail.

Step S300: The first client receives the virtual resource transfer request by using the public service account.

Specifically, the electronic device of the user receives the virtual resource transfer request sent by the application server by using the public service account to which the first client successfully logs in before. The virtual resource transfer request is a virtual resource transfer request generated for the sending request initiated by the user.

Step S302: Trigger generation of a virtual resource transfer interface by using the public service account to instruct a first virtual resource account having preset association with the first client to transfer a virtual resource to a second virtual resource account having preset association with the public service account.

Specifically, the public service account on an electronic device side of the user may trigger generation of a virtual resource transfer interface, or after receiving the virtual resource transfer request, the user inputs a payment instruction to trigger generation of a virtual resource transfer interface, so as to instruct the first virtual resource account having preset association with the first client to transfer the virtual resource to the second virtual resource account having preset association with the public service account.

Figure 4:
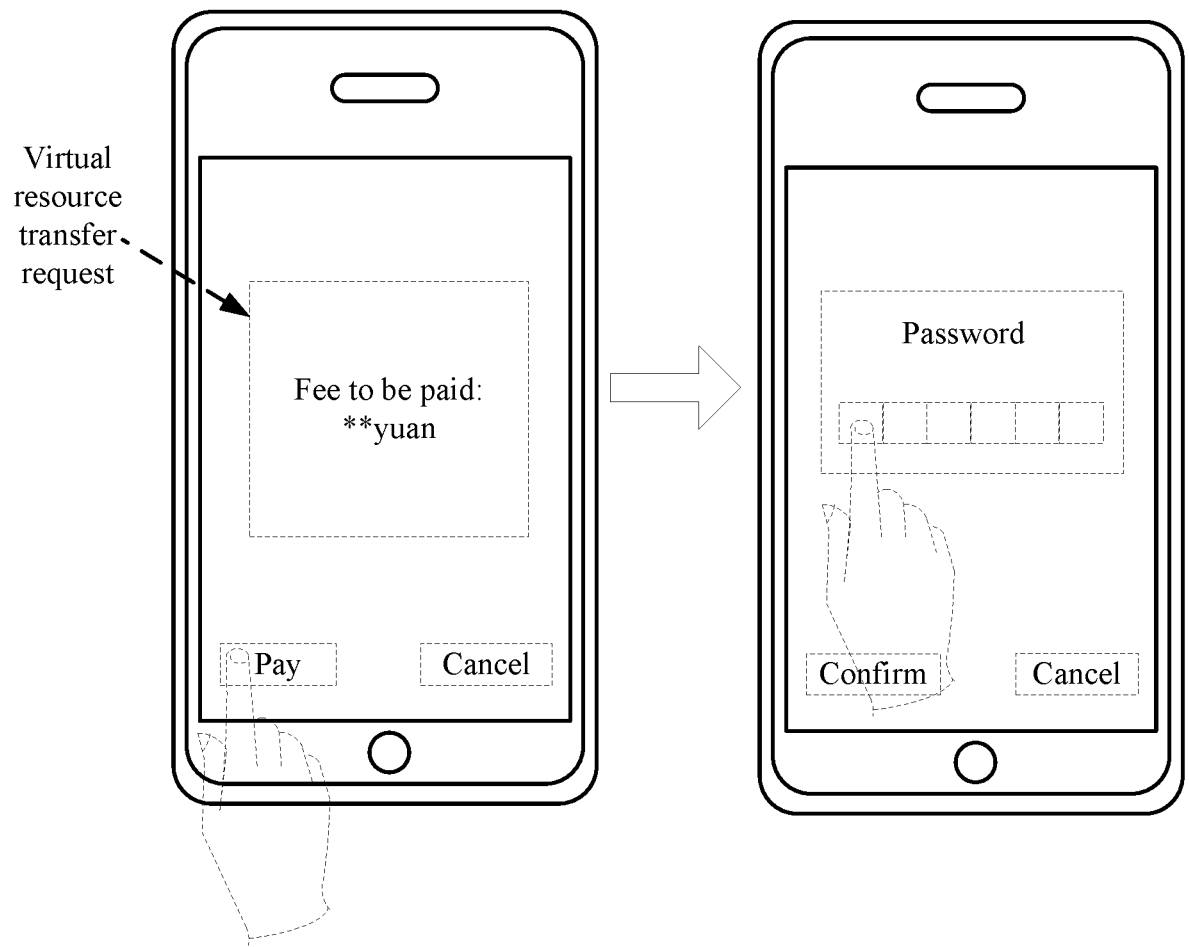
FIG. 4 is a schematic diagram of interaction of a virtual resource transfer interface according to an embodiment of the present disclosure.

Further, as shown in FIG. 4, which is a schematic diagram of interaction of a virtual resource transfer interface according to an embodiment of the present disclosure, after the electronic device side of the user receives the virtual resource transfer request, generation of the virtual resource transfer interface may be triggered by clicking "Pay". It should be noted that, in the embodiment of the present disclosure, the virtual resource transfer interface is not limited to the interaction interface shown in FIG. 4, the interaction interface in FIG. 4 is merely one instance, and no limitation is imposed in the present disclosure.

Step S304: The first client transfers the virtual resource in the first virtual resource account to the second virtual resource account according to transfer confirmation information that is input on the virtual resource transfer interface.

Specifically, the transfer confirmation information may be transfer password information that is input, and has passed password authentication. Alternatively, the user may preset a virtual resource threshold (e.g., for a spending amount warning). If a value of to-be-transferred virtual resource (e.g., charged fee associated with the current service request) is lower than the threshold, a confirmation instruction is directly input as transfer confirmation information, and a virtual resource in the first virtual resource account is transferred to the second virtual resource account. If the value is higher than the threshold, authentication, such as password authentication, needs to be performed, and only after the authentication succeeds, the virtual resource in the first virtual resource account is transferred to the second virtual resource account. In FIG. 4, inputting transfer password information is used as an example for description.

Figure 5:
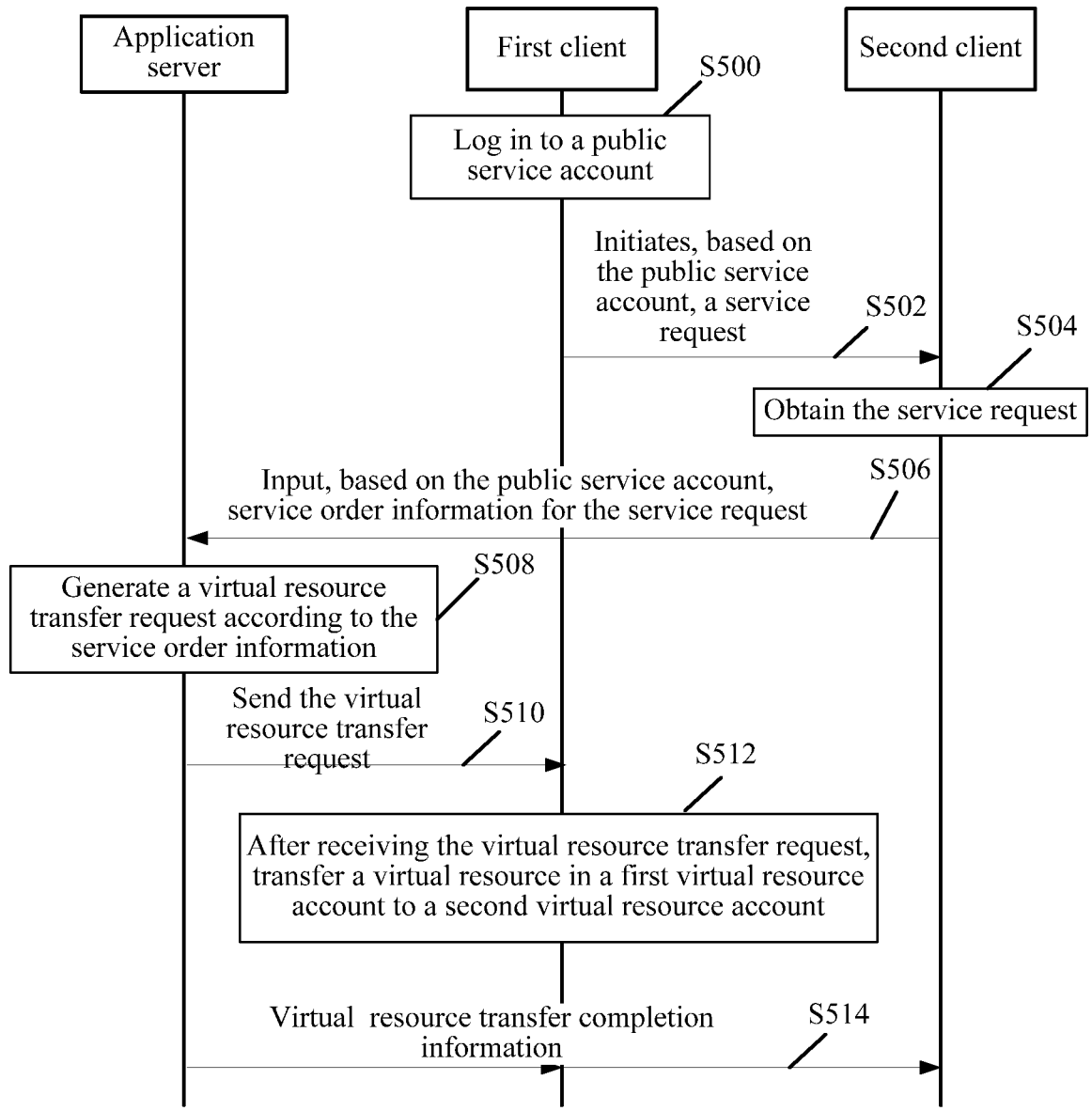
FIG. 5 is a flowchart of another embodiment of a virtual resource transfer method according to the present disclosure.

Further, as shown in FIG. 5, which is a flowchart of another embodiment of a virtual resource transfer method according to the present disclosure, the technical solution of virtual resource transfer is described by using a multi-end flowchart and includes:

Step S500: A first client logs in to a public service account.

Specifically, when a user needs to send an express item, the user may use his or her electronic device to log in to a public service account by using an identity of the first client. In this embodiment, the first client being a user account when logging in to the public service account is used as an example for description. In other words, the application server may respond to a first login request from a first client for logging into a public service account.

Step S502: The first client initiates, based on the public service account, a service request.

Specifically, the public service account is provided with an interface (such as a virtual button) for initiating a sending request, the user may initiate a sending request to a courier by using the interface, and the sending request may include basic information such as an address of the user. The basic information of the user may be filled in when the user registers the public service account. Alternatively, the basic information (such as an address of the user or an address of a destination) required for the sending may be filled in according to requirements after the sending request is initiated. In some embodiments, the service request is received by the application server associated with the public service account. The application server may process the service request, assign one or more tasks related to the service request to one or more staff user. In this way, when the staff user logs in to the public service account using a second client. The second client can obtain the service request.

Step S504: A second client obtains the service request by logging in to the public service account. In other words, the application server may respond to a second login request from a second client for logging into the public service account and send information about the service request of the first client to the second client after the second client is logged in.

Specifically, a courier uses his or her electronic device to log in to the public service account by using an identity of the second client (e.g., a staff user), to log in to the preset public service account by using an identity of the second client. Similarly, in this embodiment, the second client being a user account when logging in to the public service account is used as an example for description. If the courier sees, on the public service account, the sending request initiated by the user, the courier may perform door-to-door pick-up according to the user basic information carried in the sending request. In some embodiments, the application server may further provide an authentication code to the first client. When the staff user operating the second client is ready to respond to the service request (e.g., arrives at the pick-up location), the client user of the first client may inform the staff user about the authentication code. The staff user may enter the authentication code to verify the service request. After the second client is verified, the staff user may input detailed service order information for the service request on the second client. In this way, the application server can correctly match corresponding service request with intended staff user. Potential confusion can be avoided (e.g., two client users at same location both ordered shipping services). Further, the service providing party can monitor staff user activity and related service order information.

Step S506: The second client inputs, based on the public service account, service order information for the service request.

Specifically, in some embodiments, the second client may separately input order information for a plurality of services associated with the service request. The second client may be provided with, after logging into the public service account, a user interface for presenting the information about the service request from the first client and for inputting the order information of the plurality of services associated with the service request. When the obtained sending request includes a plurality of pieces of sending information, the courier may separately input, based on the public service account, sending order information for each piece of sending information by using the second client and collect, by using the public service account, a plurality of pieces of sending order information that is input, to generate collected sending order information. That is, when the user wants to send a plurality of express items, sending order information is separately input for each piece of express item sending information, and then, corresponding express fees may be collected or pieces of sending order information are collected and batched. That is, the application server may summarize the order information for the plurality of services by using the public service account to generate the service order information.

In other words, the client user may first place one general service request (e.g., package pick-up). After the staff user responds to the service request (e.g., arriving at the location for package pickup), a plurality of service requests (e.g., mailing multiple packages to different addresses) can be processed by the staff user. In some embodiments, the client user may store preconfigured shipping addresses and corresponding identifications (e.g., a nickname, an access code) on the application server through the user interface provided by the public service account. The staff user may, based on the identification provided by the client user, select one of the preconfigured shipping addresses as a destination address for a current shipping order.

Step S508: An application server generates a virtual resource transfer request according to the service order information.

Specifically, after the public service account receives the sending order information, the sending order information is uploaded to an application server associated with the public service account. The application server may calculate a fee according to the sending order information to generate a virtual resource transfer request. Alternatively, the sending order information received by the application server has carried fee information reported by the courier, so that a virtual resource transfer request may be directly generated.

Step S510: The application server sends the virtual resource transfer request to the first client by using the public service account. Specifically, the user interface on the first client may present detailed service order information and a total amount to be paid for this service request. In some embodiments, the user interface of the first client may allow the client user to edit/input certain field of the detailed service order information (e.g., shipping address, contacting information). If the first client modifies the order, the application server may send an updated virtual resource transfer request to the first client.

Step S512: After receiving the virtual resource transfer request, the first client transfers a virtual resource in a first virtual resource account to a second virtual resource account.

Specifically, after receiving the virtual resource transfer request, the first client on the user side performs virtual resource transfer. It could be understood that the public service account is provided with an interface (such as a virtual button) for performing virtual resource transfer, and the interface may invoke a functional module that performs virtual resource transfer to perform virtual resource transfer. The user performs virtual resource transfer to a preset virtual resource receiving part (that is, the second virtual resource account) by using the interface, and transfers a virtual resource from the first virtual resource account of the user to the second virtual resource account to complete online payment.

Step S514: After learning that the first client transfers the virtual resource in the first virtual resource account to the second virtual resource account (e.g., when receiving a confirmation from a payment server), the public service account sends virtual resource transfer completion information to the first client and/or the second client.

Specifically, after the first client on the user side completes transferring the virtual resource to the second virtual resource account transfer on the public service account, the public service account learns a message of virtual resource transfer completion and then, sends virtual resource transfer completion information to the first client or the second client or to the first client and the second client, to feed back determination information of virtual resource transfer completion to the user or the courier.

In the embodiments of the present disclosure, a first client initiates a service request by logging in to a public service account, a second client inputs, based on the public service account, service order information for the service request, an application server generates a virtual resource transfer request according to the service order information, and after receiving the virtual resource transfer request, the first client transfers a virtual resource in a first virtual resource account to a second virtual resource account, so that technical problems that operation processes of many services (such as an express service) are cumbersome and security cannot be ensured are resolved, payment for the services (such as an express fee) can be completely monitored by companies or enterprises, requirements for security, reliability, rapidity, and convenience on service fee charging in the prior art can be satisfied, and payment for the services is greatly facilitated for users.

Figure 6:
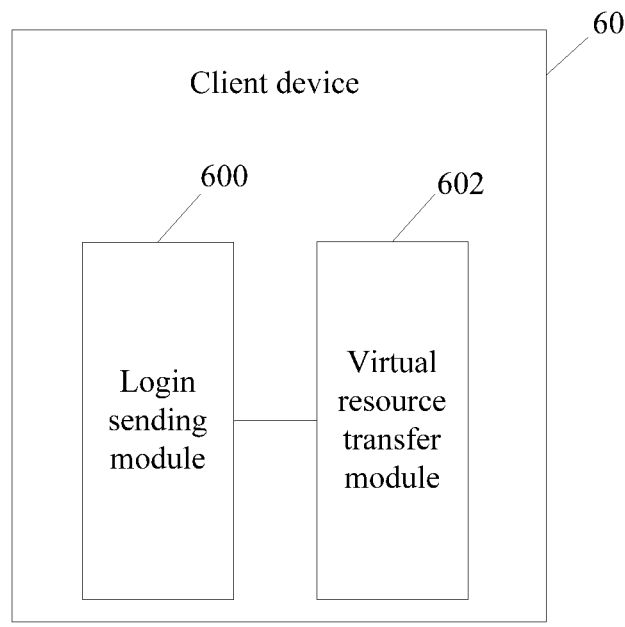
FIG. 6 is a schematic structural diagram of a client device according to an embodiment of the present disclosure.

To facilitate better implementation of the foregoing solutions of the embodiments of the present disclosure, the present disclosure correspondingly further provides a client device, and as shown in FIG. 6, which is a schematic structural diagram of a client device according to an embodiment of the present disclosure, a client device 60 may include a login sending module 600 and a virtual resource transfer module 602.

The login sending module 600 is configured to log in to a public service account, and initiate, based on the public service account, a service request, so that after obtaining the service request by logging in to the public service account, a second client inputs, based on the public service account, service order information for the service request, and an application server associated with the public service account generates a virtual resource transfer request according to the service order information, and sends the virtual resource transfer request to the client device by using the public service account.

The virtual resource transfer module 602 is configured to, after receiving the virtual resource transfer request, transfer a virtual resource in a first virtual resource account to a second virtual resource account.

Figure 7:
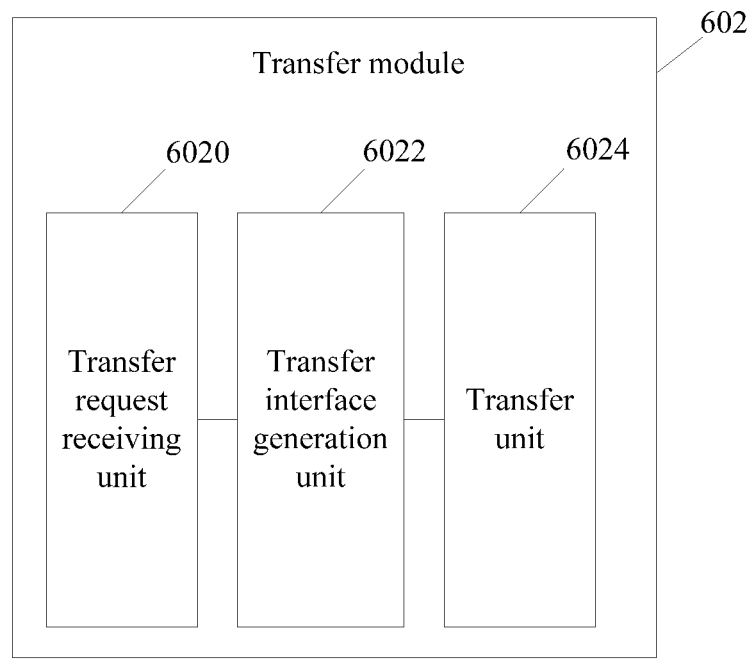
FIG. 7 is a schematic structural diagram of a virtual resource transfer module according to an embodiment of the present disclosure.

Specifically, as shown in FIG. 7, which is a schematic structural diagram of a virtual resource transfer module according to an embodiment of the present disclosure, the virtual resource transfer module 602 includes a transfer request receiving unit 6020, a transfer interface generation unit 6022, and a transfer unit 6024.

The transfer request receiving unit 6020 is configured to receive the virtual resource transfer request by using the public service account.

The transfer interface generation unit 6022 is configured to trigger generation of a virtual resource transfer interface by using the public service account to instruct the first virtual resource account having preset association with the first client to transfer the virtual resource to the second virtual resource account having preset association with the public service account.

The transfer unit 6024 is configured to transfer the virtual resource in the first virtual resource account to the second virtual resource account according to transfer confirmation information that is input on the virtual resource transfer interface.

Figure 8:
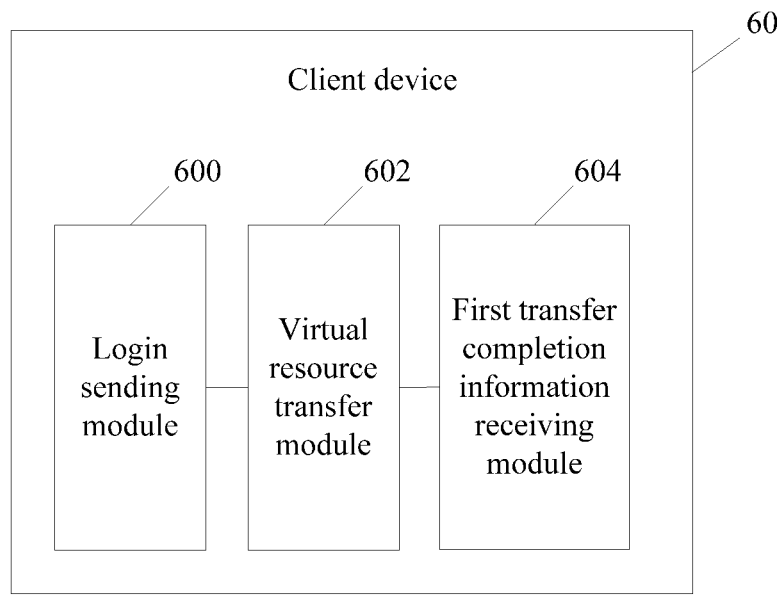
FIG. 8 is a schematic structural diagram of another embodiment of a client device according to the present disclosure.

Further, as shown in FIG. 8, which is a schematic structural diagram of another embodiment of a client device according to the present disclosure, in addition to the login sending module 600 and the virtual resource transfer module 602, the client device 60 may further include a first transfer completion information receiving module 604, configured to after the public service account learns that the first client completes virtual resource transfer according to the virtual resource transfer request, receive virtual resource transfer completion information by using the public service account.

It should be noted that in the embodiment of the present disclosure, the client device 60 includes, but is not limited to, user equipment such as a mobile phone, a mobile computer, a tablet computer, a PDA, a media player, a smart television, a smart swatch, smart glasses, and a smart bracelet. The first client in the foregoing embodiments may run on the client device 60. A function of each functional module of the client device 60 may be specifically implemented according to the method in the foregoing method embodiments. For a specific implementation process thereof, refer to related descriptions in the foregoing method embodiments. Details are not described herein again.

Figure 9:
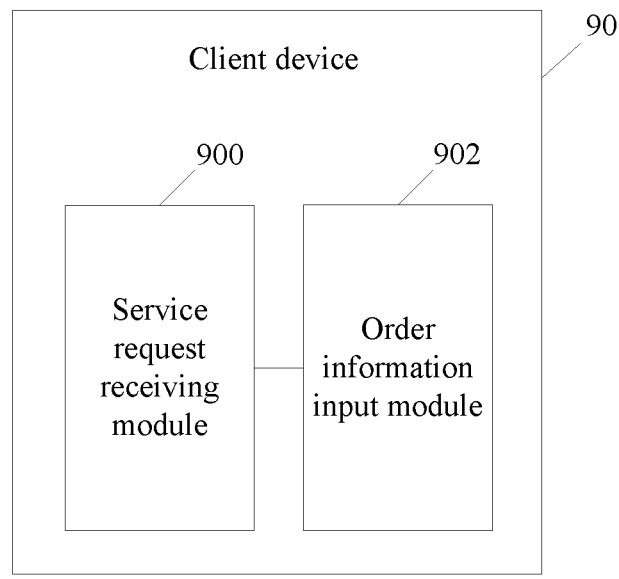
FIG. 9 is a schematic structural diagram of another embodiment of a client device according to the present disclosure.

Correspondingly, the present disclosure further provides a client device, and as shown in FIG. 9, which is a schematic structural diagram of another embodiment of a client device according to the present disclosure, a client device 90 may include a service request receiving module 900 and an order information input module 902.

The service request receiving module 900 is configured to obtain a service request by logging in to a public service account, the service request being a service request initiated, based on the public service account, by a first client by logging in to the public service account.

The order information input module 902 is configured to input, based on the public service account, service order information for the service request, so that an application server associated with the public service account generates a virtual resource transfer request according to the service order information, and sends the virtual resource transfer request to the first client by using the public service account, and after receiving the virtual resource transfer request, the first client transfers a virtual resource in a first virtual resource account to a second virtual resource account.

Figure 10:
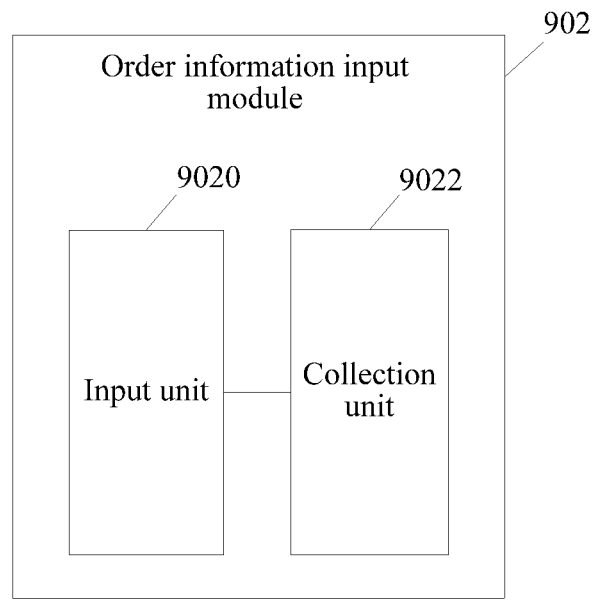
FIG. 10 is a schematic structural diagram of an order information input module according to an embodiment of the present disclosure.

Specifically, as shown in FIG. 10, which is a schematic structural diagram of an order information input module according to an embodiment of the present disclosure, the order information input module 902 includes an input unit 9020 and a collection unit 9022.

The input unit 9020 is configured to when the service request received by the service request receiving module includes a plurality of pieces of service information, separately input, based on the public service account, service order information for each service information.

The collection unit 9022 is configured to collect a plurality of pieces of input service order information by using the public service account to generate collected service order information.

Figure 11:
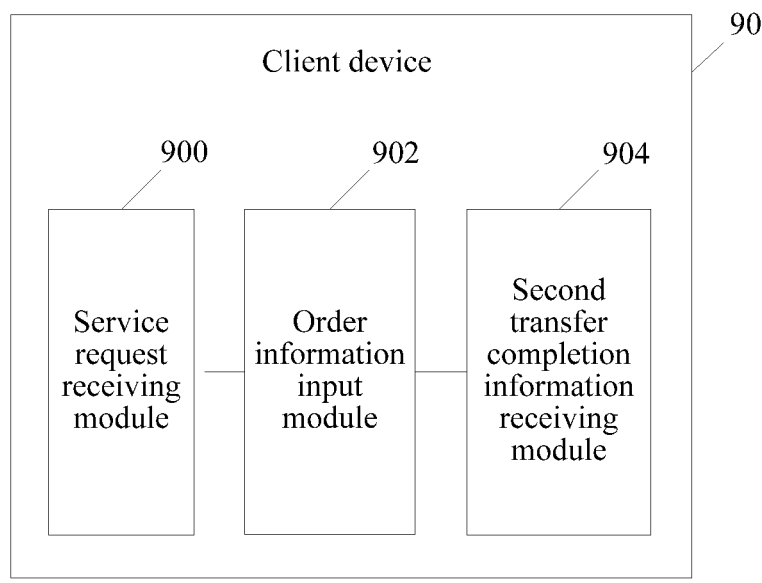
FIG. 11 is a schematic structural diagram of another embodiment of a client device according to the present disclosure.

Further, as shown in FIG. 11, which is a schematic structural diagram of another embodiment of a client device according to the present disclosure, in addition to the service request receiving module 900 and the order information input module 902, the client device 90 may further include a second transfer completion information receiving module 904, configured to after the public service account learns that the first client transfers the virtual resource in the first virtual resource account to the second virtual resource account, receive virtual resource transfer completion information by using the public service account.

It should be noted that in the embodiment of the present disclosure, the client device 90 includes, but is not limited to, user equipment such as a mobile phone, a mobile computer, a tablet computer, a PDA, a media player, a smart television, a smart swatch, smart glasses, and a smart bracelet. The second client in the foregoing embodiments may run on the client device 90. A function of each functional module of the client device 90 may be specifically implemented according to the method in the foregoing method embodiments. For a specific implementation process thereof, refer to related descriptions in the foregoing method embodiments. Details are not described herein again.

Figure 12:
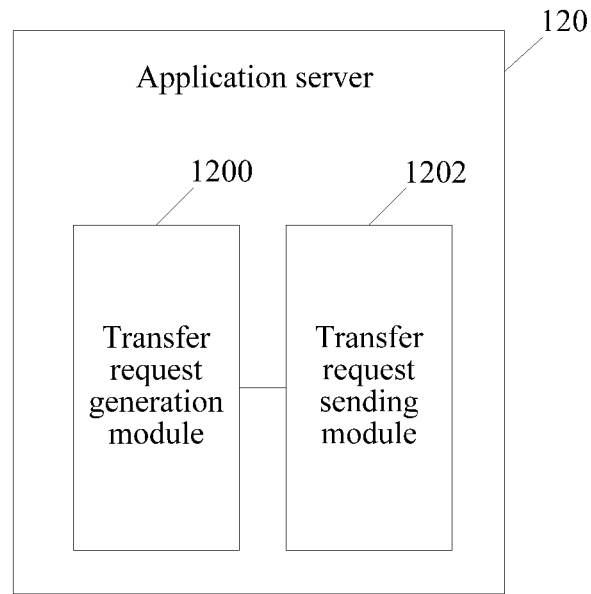
FIG. 12 is a structural schematic diagram of an application server according to an embodiment of the present disclosure.

Correspondingly, the present disclosure further provides an application server, and as shown in FIG. 12, which is a structural schematic diagram of an application server according to an embodiment of the present disclosure, an application server 120 may include a transfer request generation module 1200 and a transfer request sending module 1202.

The transfer request generation module 1200 is configured to generate a virtual resource transfer request according to service order information, the service order information being service order information input by a second client, after obtaining, by logging in to a public service account, a service request, which is a service request initiated, based on the public service account, by a first client by logging in to the public service account, based on a public service account for the service request.

Transfer request generation module 1200 is configured to send the virtual resource transfer request to the first client by using the public service account, so that after receiving the virtual resource transfer request, the first client first transfers a virtual resource in a first virtual resource account to a second virtual resource account.

It should be noted that a function of each functional module of the application server 120 may be specifically implemented according to the method in the foregoing method embodiments. For a specific implementation process thereof, refer to related descriptions in the foregoing method embodiments. Details are not described herein again.

Figure 14:
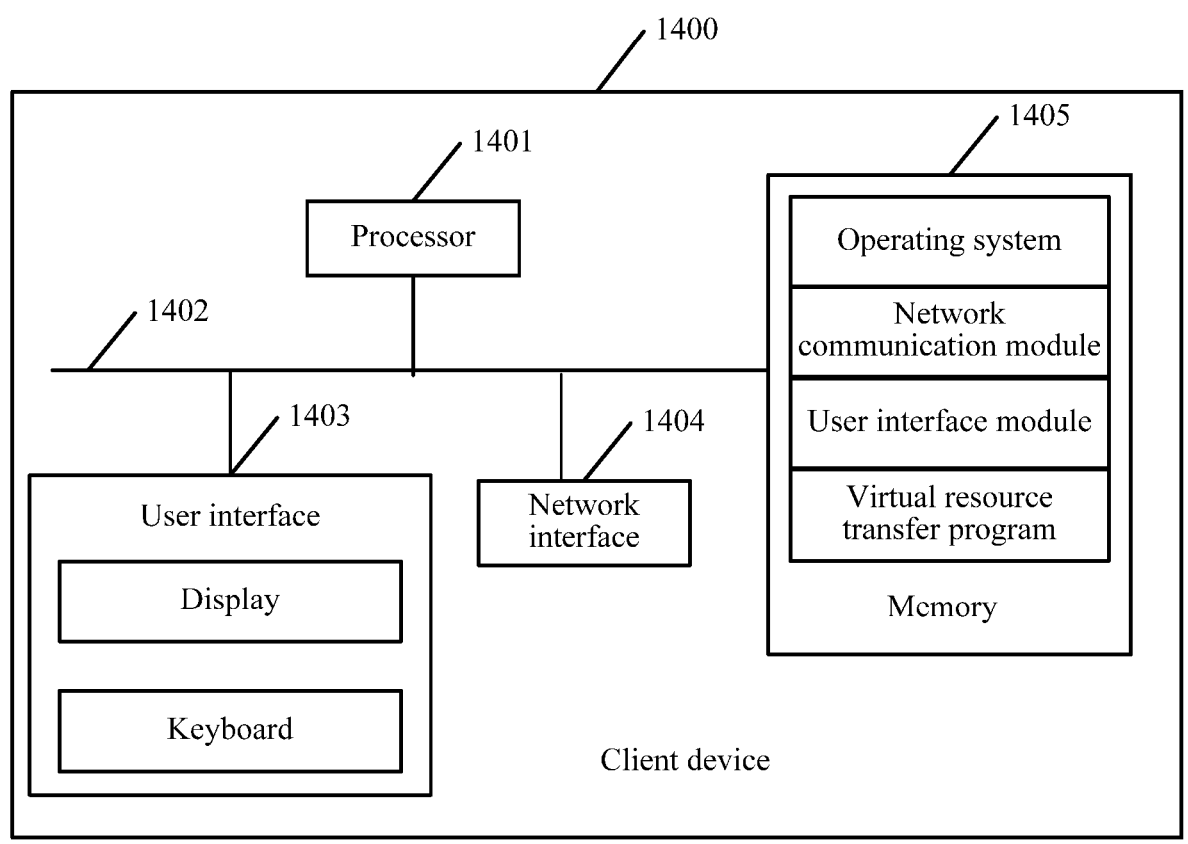
FIG. 14 is a schematic structural diagram of another embodiment of a client device according to the present disclosure.

To facilitate better implementation of the foregoing solutions of the embodiments of the present disclosure, the present disclosure further provides a client device. FIG. 14 is a schematic structural diagram of another embodiment of a client device according to the present disclosure. As shown in FIG. 14, the client device 1400 may include at least one processor 1401, such as a CPU, at least one network interface 1404, a user interface 1403, a memory 1405, and at least one communications bus 1402. The communications bus 1402 is configured to implement connection and communication between the components. The user interface 1403 may include a display and a keyboard, and optionally, the user interface 1403 may include a standard wired interface and a standard wireless interface. Optionally, the network interface 1404 may include a standard wired interface and a standard wireless interface (such as a WiFi interface). The memory 1405 may be a high speed RAM memory or a non-volatile memory, for example, at least one magnetic disk memory. Optionally, the memory 1405 may be at least one storage apparatus located remotely from the foregoing processor 1401. As shown in FIG. 5, the memory 1405, as a computer storage medium, may include an operating system, a network communication module, a user interface module, and a virtual resource transfer program (computer readable program code).

In the client device 1400 shown in FIG. 14, the user interface 1403 is mainly configured to provide an input interface for a user to obtain data input by the user, the network interface 1404 is mainly configured to perform data transmission to a server, and the processor 1401 may be configured to invoke the virtual resource transfer program stored in the memory 1405 and specifically perform the following operations:

logging in to a public service account, and initiating, based on the public service account, a service request, so that after obtaining the service request by logging in to the public service account, a second client inputs, based on the public service account, service order information for the service request, and an application server associated with the public service account generates a virtual resource transfer request according to the service order information, and sends the virtual resource transfer request to the client device by using the public service account; and after receiving the virtual resource transfer request, transferring a virtual resource in a first virtual resource account to a second virtual resource account.

In an embodiment, the after receiving the virtual resource transfer request, transferring a virtual resource in a first virtual resource account to a second virtual resource account includes:

receiving the virtual resource transfer request by using the public service account;

triggering generation of a virtual resource transfer interface by using the public service account to instruct the first virtual resource account having preset association with the first client to transfer the virtual resource to the second virtual resource account having preset association with the public service account; and transferring the virtual resource in the first virtual resource account to the second virtual resource account according to transfer confirmation information that is input on the virtual resource transfer interface.

In an embodiment, the processor 1401 is further configured to execute the virtual resource transfer program to perform the following operations:

after the public service account learns that the first client completes virtual resource transfer according to the virtual resource transfer request, receiving virtual resource transfer completion information by using the public service account.

It should be noted that in the embodiment of the present disclosure, the client device 1400 includes, but is not limited to, user equipment such as a mobile phone, a mobile computer, a tablet computer, a PDA, a media player, a smart television, a smart swatch, smart glasses, and a smart bracelet. The first client in the foregoing embodiments may run on the client device 1400.

Figure 15:
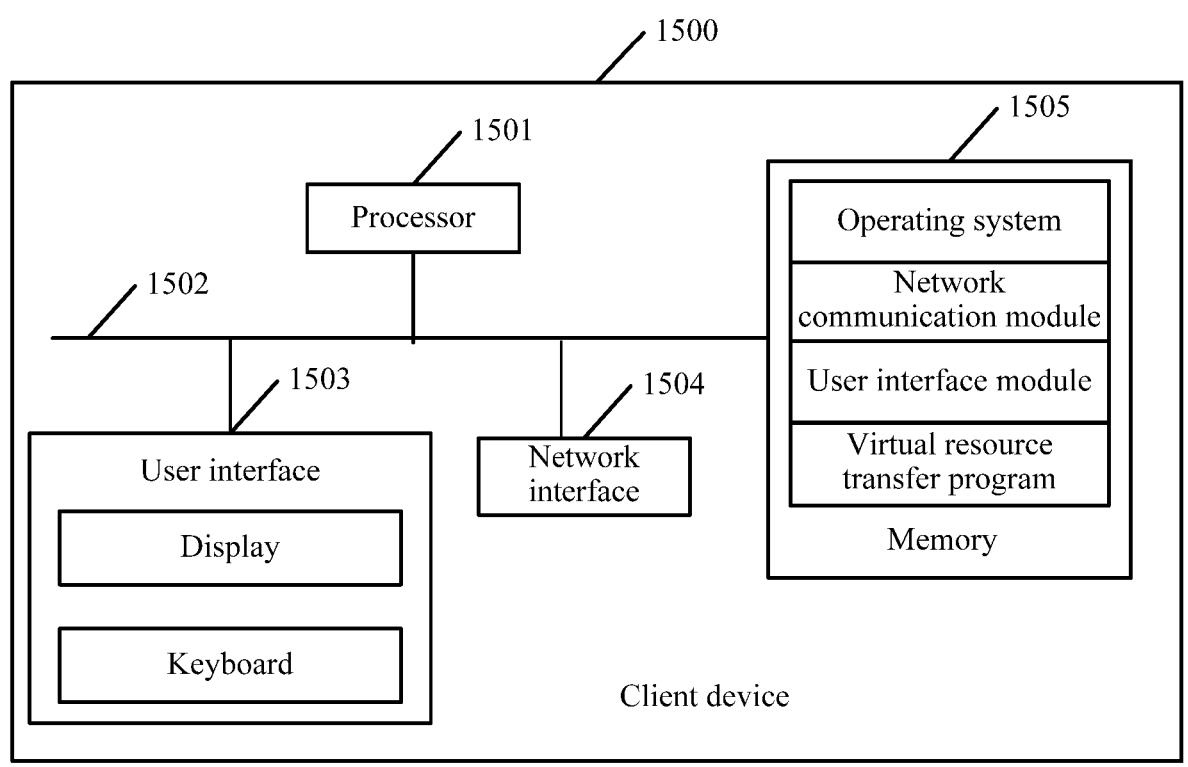
FIG. 15 is a schematic structural diagram of another embodiment of a client device according to the present disclosure.

Correspondingly, the present disclosure further provides a client device. FIG. 15 is a schematic structural diagram of another embodiment of a client device according to the present disclosure. As shown in FIG. 15, the client device 1500 may include at least one processor 1501, such as a CPU, at least one network interface 1504, a user interface 1503, a memory 1505, and at least one communications bus 1502. The communications bus 1502 is configured to implement connection and communication between the components. The user interface 1503 may include a display and a keyboard, and optionally, the user interface 1503 may include a standard wired interface and a standard wireless interface. Optionally, the network interface 1504 may include a standard wired interface and a standard wireless interface (such as a WiFi interface). The memory 1505 may be a high speed RAM memory or a non-volatile memory, for example, at least one magnetic disk memory. Optionally, the memory 1505 may be at least one storage apparatus located remotely from the foregoing processor 1501. As shown in FIG. 5, the memory 1505, as a computer storage medium, may include an operating system, a network communication module, a user interface module, and a virtual resource transfer program (computer readable program code).

In the client device 1500 shown in FIG. 15, the user interface 1503 is mainly configured to provide an input interface for a user to obtain data input by the user, the network interface 1504 is mainly configured to perform data transmission to a server, and the processor 1501 may be configured to invoke the virtual resource transfer program stored in the memory 1505 and specifically perform the following operations:

obtaining a service request by logging in to a public service account, the service request being a service request initiated, based on the public service account, by a first client by logging in to the preset public service account;

inputting, based on the public service account, service order information for the service request, so that an application server associated with the public service account generates a virtual resource transfer request according to the service order information, and sends the virtual resource transfer request to the first client by using the public service account, and after receiving the virtual resource transfer request, the first client transfers a virtual resource in a first virtual resource account to a second virtual resource account.

In an embodiment, the inputting, based on the public service account, service order information for the service request includes:

when the service request received by the service request receiving module includes a plurality of pieces of service information, separately inputting, based on the public service account, service order information for each service information; and collecting a plurality of pieces of input service order information by using the public service account to generate collected service order information.

In an embodiment, the processor 1501 is further configured to execute the computer readable program code to perform the following operation:

after the public service account learns that the first client transfers the virtual resource in the first virtual resource account to the second virtual resource account, receiving virtual resource transfer completion information by using the public service account.

It should be noted that in the embodiment of the present disclosure, the client device 1500 includes, but is not limited to, user equipment such as a mobile phone, a mobile computer, a tablet computer, a PDA, a media player, a smart television, a smart swatch, smart glasses, and a smart bracelet. The second client in the foregoing embodiments may run on the client device 1500.

Figure 16:
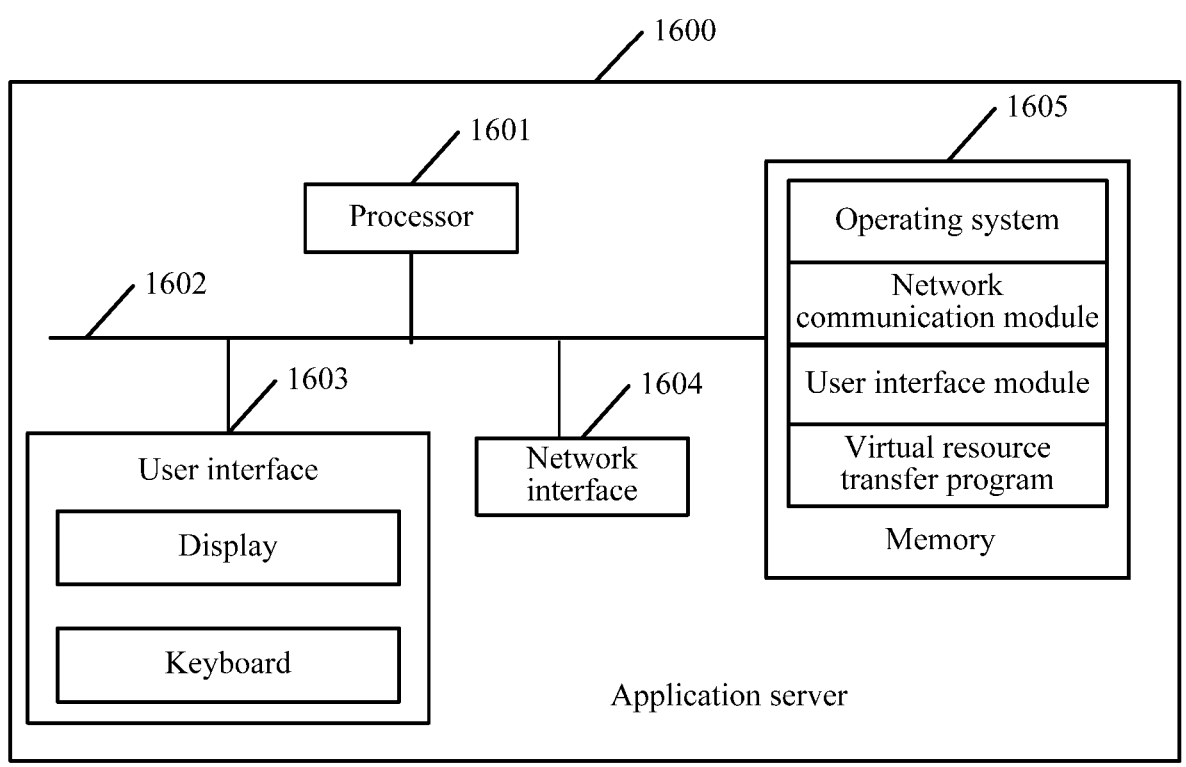
FIG. 16 is a structural schematic diagram of another embodiment of an application server according to the present disclosure.

Correspondingly, the present disclosure further provides an application server. FIG. 16 is a structural schematic diagram of another embodiment of an application server according to the present disclosure. As shown in FIG. 16, the client device 1600 may include at least one processor 1601, such as a CPU, at least one network interface 1604, a user interface 1603, a memory 1605, and at least one communications bus 1602. The communications bus 1602 is configured to implement connection and communication between the components. The user interface 1603 may include a display and a keyboard, and optionally, the user interface 1603 may include a standard wired interface and a standard wireless interface. Optionally, the network interface 1604 may include a standard wired interface and a standard wireless interface (such as a WiFi interface). The memory 1605 may be a high speed RAM memory or a non-volatile memory, for example, at least one magnetic disk memory. Optionally, the memory 1605 may be at least one storage apparatus located remotely from the foregoing processor 1601. As shown in FIG. 5, the memory 1605, as a computer storage medium, may include an operating system, a network communication module, a user interface module, and a virtual resource transfer program (computer readable program code).

In the client device 1600 shown in FIG. 16, the user interface 1603 is mainly configured to provide an input interface for a user to obtain data input by the user, the network interface 1604 is mainly configured to perform data transmission to a server, and the processor 1601 may be configured to invoke the virtual resource transfer program stored in the memory 1605 and specifically perform the following operations:

generating a virtual resource transfer request according to service order information, the service order information being service order information input by a second client, after obtaining a service request, which is a service request initiated, based on a public service account, by a first client by logging in to the public service account, based on a public service account for the service request; and sending the virtual resource transfer request to the first client by using the public service account, so that after receiving the virtual resource transfer request, the first client first transfers a virtual resource in a first virtual resource account to a second virtual resource account.

Figure 13:
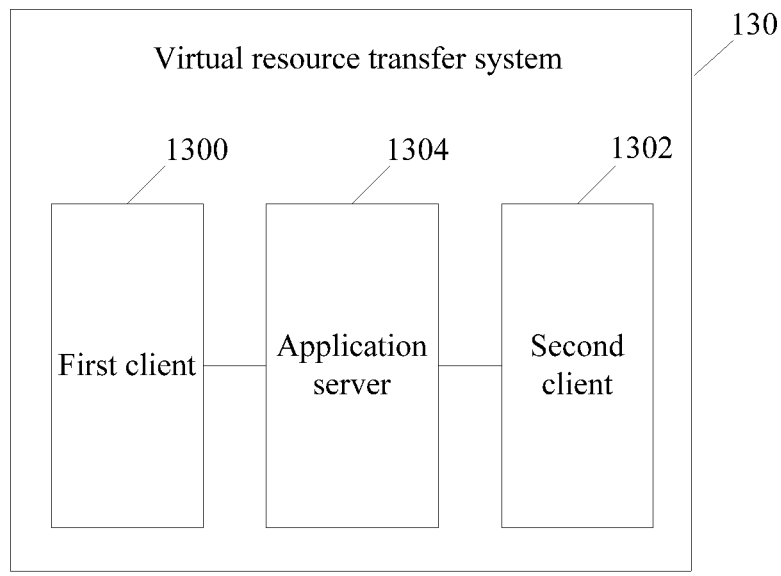
FIG. 13 is a schematic structural diagram of a virtual resource transfer system according to an embodiment of the present disclosure.

Correspondingly, the present disclosure further provides a virtual resource transfer system. As shown in FIG. 13, which is a schematic structural diagram of a virtual resource transfer system according to an embodiment of the present disclosure, a virtual resource transfer system 130 may include a first client 1300, a second client 1302, and an application server 1304.

The first client 1300 logs in to a public service account, and initiates, based on the public service account, a service request; after obtaining the service request by logging in to the public service account, the second client 1302 inputs, based on the public service account, service order information for the service request; the application server 1304 associated with the public service account generates a virtual resource transfer request according to the service order information, and sends the virtual resource transfer request to the first client 1300 by using the public service account; and after receiving the virtual resource transfer request, the first client 1300 transfers a virtual resource in a first virtual resource account to a second virtual resource account.

Specifically, the first client 1300 may be the client device 60 in FIG. 6 to FIG. 8, the second client 1302 may be the client device 90 in FIG. 9 to FIG. 11, and the application server 1304 may be the application server 120 in FIG. 12. For how the virtual resource transfer system 130 specifically transfers a virtual resource, correspondingly refer to descriptions in the foregoing method embodiments. Details are not described herein again.

In the embodiments of the present disclosure, a first client initiates a service request by logging in to a public service account, a second client inputs, based on the public service account, service order information for the service request, an application server generates a virtual resource transfer request according to the service order information, and after receiving the virtual resource transfer request, the first client transfers a virtual resource in a first virtual resource account to a second virtual resource account, so that technical problems that operation processes of many services are cumbersome and security cannot be ensured are resolved, payment for the services can be completely monitored by companies or enterprises, requirements for security, reliability, rapidity, and convenience on service fee charging in the prior art can be satisfied, and payment for the services is greatly facilitated for users.

In conclusion, in the embodiments of the present disclosure, a first client initiates a service request by logging in to a public service account, a second client inputs, based on the public service account, service order information for the service request, an application server generates a virtual resource transfer request according to the service order information, and after receiving the virtual resource transfer request, the first client transfers a virtual resource in a first virtual resource account to a second virtual resource account, so that technical problems that operation processes of many services (such as an express service) are cumbersome and security cannot be ensured are resolved, payment for the services (such as an express fee) can be completely monitored by companies or enterprises, requirements for security, reliability, rapidity, and convenience on service fee charging in the prior art can be satisfied, and payment for the services is greatly facilitated for users.

A person of ordinary skill in the art may understand that, all or a part of the processes of the foregoing method embodiments may be implemented by a computer program instructing relevant hardware. The foregoing program may be stored in a computer readable storage medium. When the program runs, the steps of the foregoing method embodiments are performed. The storage medium may be a hard disk, an optical disc, a read-only memory (ROM), a random access memory (RAM), or the like.

The above disclosures are merely preferred embodiments of the present disclosure and certainly cannot be used to limit the scope of the claims of the present disclosure. Therefore, any equivalent change made according to the claims of the present disclosure still falls within the scope of the present disclosure.

What is claimed is:

1. A virtual resource transfer method, comprising:
responding to, by an application server associated with a public service account, a first login request from a first client for logging into a public service account through a social application on the first client, the public service account being registered by a service provider on the social application;
providing, by the application server, an interactive interface of the public service account used as a service page in the social application, the social application on the first client being logged in by a first user, wherein the application server corresponds to the public service account and provides service for users of the social application, the application server is connected to a processing server of the social application, and interactions between the users and the public service account are managed by the processing server;
receiving, by the application server, a service request initiated by the first client when the first client is accessing the service page in the social application after the first client is logged in, the service request including basic information of the service request inputted by the first client on the service page of the public service account in the social application;
responding to, by the application server, a second login request from a second client for logging into the public service account through the social application on the second client, the social application on the second client being logged in by a second user;
sending, by the application server, information about the service request of the first client to the second client after the second client is logged in;
receiving, by the application server, service order information for the service request from the second client when the second client associated with the service provider is operated to respond to the service request, including:
receiving, based on the public service account, order information for a plurality of services associated with the service request of the first client separately inputted by the second client when a user operating the second client arrives at a pick-up location indicated by the service request of the first client; and
summarizing the order information for the plurality of services by using the public service account to generate the service order information for the first client;

generating, by the application server, a virtual resource transfer request according to the service order information;

sending, by the application server, the virtual resource transfer request to the first client by using the public service account, the virtual resource transfer request being configured for transferring, from the first client, a virtual resource in a first virtual resource account to a second virtual resource account associated with a holder of the public service account.

2. The method according to claim 1, wherein transferring, by the first client, a virtual resource in a first virtual resource account to a second virtual resource account comprises:

receiving, by the first client, the virtual resource transfer request by using the public service account;

triggering generation of a virtual resource transfer interface by using the public service account to instruct the first virtual resource account having preset association with the first client to transfer the virtual resource to the second virtual resource account having preset association with the public service account; and transferring, by the first client, the virtual resource in the first virtual resource account to the second virtual resource account according to transfer confirmation information that is input on the virtual resource transfer interface.

3. The method according to claim 1, further comprising:
after responding to the second login request, providing, for the second client, a user interface for presenting the information about the service request from the first client and for inputting the order information of the plurality of services associated with the service request.

4. The method according to claim 1, wherein after the transferring a virtual resource in a first virtual resource account to a second virtual resource account, the method further comprises:
after learning that the first client transfers the virtual resource in the first virtual resource account to the second virtual resource account, sending, by the public service account, virtual resource transfer completion information to the first client and the second client.

5. The method according to claim 1, wherein:
the second client is operated by a staff user of the service provider at a service area associated with the first client.

6. The method according to claim 1, further comprising at least one of:
providing order history to the first client at the service page in the social application; and
modifying user profile information according to an input from the first client at the service page in the social application.

7. The method according to claim 1, wherein:
the service request does not carry address information of a delivery destination when being initiated by the first client; and
the address information of delivery destinations associated with the service request is inputted by the second client within the order information.

8. A virtual resource transfer method, comprising:
logging, by a second client, into a public service account through a social application on the second client, the public service account being registered by a service provider on the social application, the social application on the second client being logged in by a second user, wherein the application server corresponds to the public service account and provides service for users of the social application, the application server is connected to a processing server of the social application, and interactions between the users and the public service account are managed by the processing server;

obtaining, by the second client, a service request after logging in to the public service account, the service request being a service request initiated, based on the public service account, by a first client by logging in to the public service account through the social application on the first client and accessing an interactive interface of the public service account used as a service page in the social application, the social application on the first client being logged in by a first user, the service request including basic information of the service request inputted by the first client on the service page of the public service account in the social application; and inputting, by the second client, based on the public service account, service order information for the service request when the second client associated with the service provider is operated to respond to the service request, so that an application server associated with the public service account generates a virtual resource transfer request according to the service order information, and sends the virtual resource transfer request to the first client by using the public service account, and after receiving the virtual resource transfer request, the first client transfers a virtual resource in a first virtual resource account to a second virtual resource account associated with a holder of the public service account, wherein the inputting, based on the public service account, service order information for the service request comprises:

separately inputting, based on the public service account, order information for a plurality of services associated with the service request from the first client when a user operating the second client arrives at a pick-up location indicated by the service request of the first client; and summarizing the order information for the plurality of services by using the public service account to generate the service order information for the first client.

9. The virtual resource transfer method according to claim 8, further comprising:
presenting a user interface for presenting information about the service request from the first client and for inputting the order information of the plurality of services associated with the service request.

10. The virtual resource transfer method according to claim 8, further comprising:
after the public service account learns that the first client transfers the virtual resource in the first virtual resource account to the second virtual resource account, receiving virtual resource transfer completion information by using the public service account.

11. A client device, comprising:
a memory, which stores computer readable program code; and
a processor, configured to execute the computer readable program code to perform operations comprising:
logging into a public service account through a social application on the second client, the public service account being registered by a service provider on the social application, the social application on the second client being logged in by a second user, wherein the application server corresponds to the public service account and provides service for users of the social application, the application server is connected to a processing server of the social application, and interactions between the users and the public service account are managed by the processing server;

obtaining a service request after logging in to the public service account, the service request being a service request initiated, based on the public service account, by a first client by logging in to the public service account through the social application on the first client and accessing an interactive interface of the public service account used as a service page in the social application, the social application on the first client being logged in by a first user, the service request including basic information of the service request inputted by the first client on the service page of the public service account in the social application; and inputting, based on the public service account, service order information for the service request when the second client associated with the service provider is operated to respond to the service request, so that an application server associated with the public service account generates a virtual resource transfer request according to the service order information, and sends the virtual resource transfer request to the first client by using the public service account, and after receiving the virtual resource transfer request, the first client transfers a virtual resource in a first virtual resource account to a second virtual resource account associated with a holder of the public service account, wherein the inputting, based on the public service account, service order information for the service request comprises:

separately inputting, based on the public service account, order information for a plurality of services associated with the service request from the first client when a user operating the second client arrives at a pick-up location indicated by the service request of the first client and summarizing the order information for the plurality of services by using the public service account to generate the service order information for the first client.

12. The client device according to claim 11, wherein the processor is further configured for: presenting a user interface for presenting information about the service request from the first client and for inputting the order information of the plurality of services associated with the service request.

13. The client device according to claim 11, wherein the processor is further configured to execute the computer readable program code to perform the following operation:

after the public service account learns that the first client transfers the virtual resource in the first virtual resource account to the second virtual resource account, receiving virtual resource transfer completion information by using the public service account.

14. An application server, comprising:

a memory, which stores computer readable program code; and a processor, configured to execute the computer readable program code to perform operations comprising:

responding to a first login request from a first client for logging into a public service account through a social application on the first client, wherein the public service account is associated with the application server, the public service account being registered by a service provider on the social application, the social application on the first client being logged in by a first user, wherein the application server corresponds to the public service account and provides service for users of the social application, the application server is connected to a processing server of the social application, and interactions between the users and the public service account are managed by the processing server;

providing an interactive interface of the public service account used as a service page in the social application;

receiving a service request initiated by the first client when the first client is accessing the service page in the social application after the first client is logged in, the service request including basic information of the service request inputted by the first client on the service page of the public service account in the social application;

responding to a second login request from a second client for logging into the public service account through the social application on the second client, the social application on the second client being logged in by a second user;

sending information about the service request of the first client to the second client after the second client is logged in;

receiving service order information for the service request from the second client when the second client associated with the service provider is operated to respond to the service request, including:

receiving, based on the public service account, order information for a plurality of services associated with the service request of the first client separately inputted by the second client when a user operating the second client arrives at a pick-up location indicated by the service request of the first client; and summarizing the order information for the plurality of services by using the public service account to generate the service order information for the first client;

generating a virtual resource transfer request according to service order information;

sending the virtual resource transfer request to the first client by using the public service account, so that after receiving the virtual resource transfer request, the first client transfers a virtual resource in a first virtual resource account to a second virtual resource account associated with a holder of the public service account.

15. The application server according to claim 14, wherein the processor is further configured to perform operations comprising:

triggering generation of a virtual resource transfer interface by using the public service account to instruct the first virtual resource account having preset association with the first client to transfer the virtual resource to the second virtual resource account having preset association with the public service account; and transferring, by the first client, the virtual resource in the first virtual resource account to the second virtual resource account according to transfer confirmation information that is input on the virtual resource transfer interface.

16. The application server according to claim 14, wherein the processor is further configured to perform operations comprising:

after responding to the second login request, providing, for the second client, a user interface for presenting the information about the service request from the first client and for inputting the order information of the plurality of services associated with the service request.

17. The application server according to claim 14, wherein after the transferring a virtual resource in a first virtual resource account to a second virtual resource account, the processor is further configured to perform operations comprising:
    after learning that the first client transfers the virtual resource in the first virtual resource account to the second virtual resource account, sending, by the public service account, virtual resource transfer completion information to the first client and the second client.

* * * * *